(12) United States Patent
Scheerlinck et al.

(10) Patent No.: US 7,662,252 B2
(45) Date of Patent: Feb. 16, 2010

(54) METHOD FOR PRODUCING A REINFORCED POLYESTER NON-WOVEN MATERIAL

(75) Inventors: Philippe Marie Scheerlinck, Lakewood, CO (US); Stephan M. Rapp, Simpsonville, SC (US); Wolfgang Greiser, Neusäβ (DE)

(73) Assignee: Johns Manville, Denver, CO (US)

( * ) Notice: Subject to any disclaimer, the term of this patent is extended or adjusted under 35 U.S.C. 154(b) by 146 days.

(21) Appl. No.: 11/051,913

(22) Filed: Feb. 4, 2005

(65) Prior Publication Data

US 2006/0178066 A1    Aug. 10, 2006

(51) Int. Cl.
*B32B 37/24*    (2006.01)
*B32B 37/02*    (2006.01)

(52) U.S. Cl. ............ 156/307.3; 156/276; 156/279; 156/307.1; 156/307.4

(58) Field of Classification Search .......... 156/307.1, 156/307.3, 307.4, 276, 279
See application file for complete search history.

(56) References Cited

U.S. PATENT DOCUMENTS

| | | | |
|---|---|---|---|
| 4,118,272 A | * | 10/1978 | Ziegler et al. ............ 162/156 |
| 4,188,355 A | * | 2/1980 | Graham et al. ............ 264/422 |
| 4,539,254 A | * | 9/1985 | O'Connor et al. ........... 442/32 |
| 6,045,645 A | | 4/2000 | Groh et al. |
| 6,197,707 B1 | | 3/2001 | Weiter et al. |
| 6,723,670 B2 | | 4/2004 | Kajander et al. |
| 6,764,968 B1 | | 7/2004 | Hindi et al. |

OTHER PUBLICATIONS

"Bound." The American Heritage® Dictionary of the English Language, Fourth Edition. Houghton Mifflin Company, 2004.*
"Loose." The American Heritage® Dictionary of the English Language, Fourth Edition. Houghton Mifflin Company, 2004.*
"Loose." The American Heritage® Dictionary of the English Language, Fourth Edition. Houghton Mifflin Company, 2004. Definitions 1-11.*

* cited by examiner

*Primary Examiner*—Andrew T Piziali
(74) *Attorney, Agent, or Firm*—Robert D. Touslee

(57) ABSTRACT

A method for producing a reinforced polyester non-woven material suitable for use as a roofing material, comprising: forming a mixture comprising glass fibers and a liquid binder; applying the mixture to a polyester non-woven material; and curing the liquid binder to form a layer comprising glass fibers that is attached to the polyester non-woven material.

8 Claims, No Drawings

METHOD FOR PRODUCING A REINFORCED POLYESTER NON-WOVEN MATERIAL

BACKGROUND

Membranes and sheets such as a bitumen-containing sheet can be used as roofing construction materials in both residential and commercial applications. Such membranes and sheets can further contain a layer formed from glass yarn, glass thread or glass mat, or a polymer layer to improve structural characteristics.

Such glass yarn, glass thread or glass mat materials used to manufacture the membrane or sheet are typically commercially available as finished products and thus can be relatively expensive to obtain. Moreover, the use of such preformed, commercially available glass products can slow down the manufacturing process and contribute to additional process inefficiencies.

SUMMARY

According to one aspect, a method for producing a reinforced polyester non-woven material suitable for use as a roofing material is provided, comprising:

forming a mixture comprising glass fibers and a liquid binder;

applying the mixture to a polyester non-woven material; and curing the liquid binder to form a layer comprising glass fibers that is attached to the polyester non-woven material.

According to another aspect, a method for producing a reinforced polyester non-woven material suitable for use as a roofing material is provided, comprising:

forming a first layer of polyester non-woven material;

forming a layer of glass fibers above the first layer of polyester non-woven material;

forming a second layer of polyester non-woven material above the layer of glass fibers;

applying a liquid binder to the resulting structure; and curing the liquid binder such that the layer of glass fibers is attached to the first and second layers of polyester non-woven material.

DETAILED DESCRIPTION

The reinforced polyester non-woven material formed by the methods described herein can be suitable for use as a roofing and/or waterproofing material in residential or commercial applications. Additionally or alternatively, the reinforced polyester non-woven material can be suitable for use in bridge covering and/or tunnel building applications. In an exemplary embodiment, the reinforced polyester non-woven material can be used in conjunction with at least one bitumen-containing layer to form a roofing material. Use of the methods described herein can provide a more efficient and/or cost-effective manner in preparing reinforced roofing materials. In addition, reinforced materials formed from such methods can have improved properties including, for example, improved thermo-dimensional stability and/or improved flame resistance.

As used herein, the term "polyester non-woven material" refers to a non-woven material which comprises a polyester polymer, and which can optionally contain an additional thermoplastic polymer. The polyester polymer can include, for example, a polyester homopolymer, a polyester copolymer or a mixture thereof. For example, the polyester non-woven material can include a coextruded spunbond fiber including a polyester homopolymer core and a copolymer shell. Any known polyester polymer suitable for fibermaking can be used, preferably a melt-spinnable polyester. The polyester non-woven material can be additionally formed from other thermoplastic polymers such as, for example, polypropylene, a polyamide such as polyhexamethylenediadipamide, polycaprolactam, a wholly or partially aromatic polyamide ("aramids"), an aliphatic polyamide such as nylon, a partially or wholly aromatic polyester, polyphenylene sulfide (PPS), a polymer having ether and keto groups such as a polyetherketone (PEKs) or polyetheretherketone (PEEK), or a polybenzimidazole. Exemplary polymers which can be used to form the synthetic non-woven material are disclosed in U.S. Pat. No. 6,045,645, the contents of which are incorporated by reference herein.

The polyester non-woven material can be formed from a single layer of material or a plurality of layers of material. In a preferred embodiment, the polyester non-woven material is formed from three or four layers of material. In the case where a plurality of layers of material is used, a binder can be applied to one or more of the layers in order to bind the layers together. Any binder suitable for binding layers of polyester non-woven material can be used such as, for example, an acrylate, styrenebutadien, latex or mixtures thereof. Preferably, the binder can be in the form of a water dispersion to facilitate application thereof.

The dimensions of the polyester non-woven material can depend on, for example, the intended use of the polyester non-woven material and/or the specific process and equipment used to form the material, and are not particularly limited. For example, the dimensions of the polyester non-woven material can enable the final product to be used as a construction material, and/or can facilitate the production, handling, transport and/or installation of the material. In an exemplary embodiment, the polyester non-woven material can have an elongated shape such as a continuous strip of material, which can facilitate winding of the material onto a roll. For example, such elongated shape can also enable the continuous processing of the material.

In an exemplary embodiment, the polyester non-woven material can have a thickness from about 0.4 to about 2.0 mm, preferably from about 0.65 to about 1.70 mm. The polyester non-woven material can have a width of about 0.74 to about 3.0 m, preferably from about 1.0 to about 2.0 m. The weight of the polyester non-woven material can be from about 50 to about 300 grams/$m^2$, more preferably from about 110 to about 250 grams/$m^2$.

The polyester non-woven material can be formed by any process suitable for forming a substrate suitable for being reinforced by glass fibers. In an exemplary embodiment, the synthetic non-woven material can be a spunbond material that is produced by, for example, laydown of freshly melt-spun filaments. For example, such spunbond material can be formed from continuous filament synthetic fibers of melt-spinnable polymer materials. Exemplary processes and materials for forming a spunbond material are described in U.S. Pat. No. 6,045,645, contents of which are incorporated by reference herein. Additionally or alternatively, the synthetic non-woven material can include staple fiber polyester in the form of non-continuous fibers.

Glass fibers can be used to provide structural reinforcement to the polyester non-woven material. As used herein, the term "glass fibers" refers to non-continuous segments of glass. In a preferred embodiment, the glass fibers do not include glass yarns and/or glass threads which are continuous materials. The glass fibers in the form of non-continuous fibers can facilitate distribution and application of the glass fibers in the process for forming the reinforced material. Any known glass fibers suitable for providing structural reinforcement to the polyester non-woven material can be used. For example, glass fibers can be used which are available under the tradename E- or C-glass Duracore and Chop Pack from Johns Manville, located in Denver, Colo.

The glass fibers can have a shape and size which can enable structural reinforcement of the polyester non-woven material when the glass fibers are incorporated with such material. In an exemplary embodiment, the glass fibers can be either microfibers or regular fibers, and can have a diameter of from about 0.2 to about 30 microns, preferably from about 10 to about 20 microns. While not wishing to be bound by any particular theory, it is believed that the use of glass fibers in the above size range can result in an improvement in mixing and/or dispersion of the glass fibers in a liquid binder. It is also believed that the use of glass fibers in the above size range can enable reduction of an undesirable change in viscosity of a liquid binder upon addition of the glass fibers thereto, which can in turn facilitate processing. The glass fibers can have any suitable length such as, for example, from about 0.25 to about 2 inches, preferably about 0.5 to about 1.25 inch.

A liquid binder can be used to bind the glass fibers together, for example, to form a glass fiber-containing layer, and to adhere such glass fiber-containing layer to the polyester non-woven material. In an exemplary embodiment, the liquid binder can be in the form of an aqueous solution, for example, the binder can be dissolved in water. Preferably, the amount of binder present in the liquid binder can be effective to enable the glass fibers to bind together to form a layer, and to adhere such glass fiber-containing layer to the polyester non-woven material. For example, the binder can be present in an amount from about 5% to about 25%, preferably from about 7% to about 19%, based on the volume of the liquid. Any binder suitable for binding glass fibers can be used including, for example, an acrylate, styrenebutadien, latex or mixtures thereof. Preferably, the binder can be in the form of a water dispersion to facilitate application thereof.

An exemplary method for forming a reinforced polyester non-woven material is now described. Such material can be produced by forming a mixture of glass fibers and a liquid binder, and applying such mixture to a polyester non-woven material. The glass fibers can be mixed with the liquid binder using conventional equipment and processes. For example, the mixture of glass fibers and the liquid binder can be formed by mixing the glass fibers with the liquid binder, for example, under conditions enabling substantial mixture of the glass fibers with the liquid binder. In an exemplary embodiment, the glass fibers can be added to the liquid binder.

The amount of glass fibers that can be present in the mixture can depend on, for example, the desired properties of the final reinforced non-woven material such as the desired amount of glass fibers per unit area of the reinforced material. For example, employing an insufficient amount of glass fibers to the mixture can result in a material which does not have a sufficient degree of structural reinforcement. On the other hand, employing an excessive amount of glass fibers to the mixture can result in the formation of precipitate in the binder dispersion and/or the formation of a mat having an unsuitably large thickness.

The mixture of the glass fibers and the liquid binder can also contain a dispersing agent that is present in an amount effective to disperse the glass fibers in the liquid. For example, the dispersing agent can include any material suitable for dispersing the glass fiber in the liquid binder. The dispersing agent can be present in the liquid binder in an amount effective to disperse the glass fibers. The mixture can be in any form which facilitates the application of the mixture to the polyester non-woven material such as, for example, a liquid dispersion, emulsion or foam.

The mixture of glass fibers and liquid binder can be applied to the synthetic non-woven material in a manner which enables glass fibers to bind together to form a layer, and for the glass fiber-containing layer to adhere to the polyester non-woven material. For example, the mixture can be applied to the polyester non-woven material while such material is being conveyed such as on a conveyor belt. Preferably, the mixture is applied in manner which enables the mixture to contact substantially the entire area of the polyester non-woven material. The mixture can be applied to the upper surface, the lower surface or both surfaces of the polyester non-woven material.

After application of the mixture to the synthetic non-woven material, the binder present in the liquid can be subject to curing. For example, the manner in which the binder is cured can at least depend on, for example, the type and amount of binder used, the type and amount of glass fiber used and/or the structure of the synthetic non-woven material. For example, the binder can be cured with air at an elevated temperature, IR radiation, UV radiation and combinations thereof. The resulting product can have a glass fiber layer present on the top surface, the bottom surface, or both surfaces of the synthetic non-woven material.

According to another aspect, a reinforced polyester non-woven material can be formed by forming a layer of glass fibers on a first layer of polyester non-woven material. The first layer of polyester non-woven material can be formed by any suitable method such as the process for forming a spunbond described above. In an exemplary embodiment, the glass fibers can be loose, unbound fibers which can be, for example, substantially free of a binder. That is, in an exemplary embodiment, the glass fibers are not necessarily pre-mixed with a liquid binder prior to application thereof to the layer of polyester non-woven material.

The layer of glass fibers can be formed on the first layer of material by using any suitable process and equipment such as a blower and/or a loss-in-weight feeder to distribute the glass fibers. The loss-in-weight feeder can include a container for containing the glass fibers, wherein the container has at least one opening through which the glass fibers may pass. The loss-in-weight feeder can further contain a device for agitating the container to cause glass fibers to pass through the at least one opening. The weight of the container and the glass fibers therein can be monitored to determine the amount of glass fibers dispensed from the container.

The glass fibers can be substantially evenly applied to the first layer such that a layer of glass fibers having a substantially constant thickness is formed. The layer of glass fibers can have a thickness sufficient to impart structural reinforcement to the final product such as, for example, from about 0.3 to about 1.5 mm, preferably from about 0.5 to about 0.8 mm.

After formation of the layer of glass fibers, at least one additional layer of polyester non-woven material can be formed above the layer of glass fibers. For example, two or three additional layers of polyester non-woven material can be formed. In an exemplary embodiment, additional layers of glass fibers can be formed between any of the additional layers of polyester non-woven material in the manner described above. Any suitable process can be used to form such additional layers of polyester non-woven material including, for example, the process for forming a spunbond described above.

A binder can be applied to the resulting multilayered structure to bind the glass fibers together to form a glass fiber layer, and to adhere each of the individual layers together. Suitable binders and processes for applying and curing the binder are described above.

The orientation of the glass fibers with respect to the direction in which the non-woven material is produced, can have an effect on the properties of the product. In an exemplary embodiment, the mixture can be applied to the synthetic non-woven such that a majority of the glass fibers and preferably substantially all of the glass fibers are substantially oriented in the plane of the polyester non-woven material. That is, in an exemplary embodiment, the mixture can be applied in manner which reduces or prevents the glass fibers from standing on end with respect to the surface of the polyester non-woven material. In an exemplary embodiment, the mixture can be applied to the polyester non-woven material such that a majority of the glass fibers and preferably substantially all of the glass fibers are randomly oriented with respect to the longitudinal direction of the material. While not wishing to be bound by any particular theory, it is believed that the use of randomly oriented glass fibers can provide improved structural reinforcement in comparison with glass fibers which on average are substantially oriented in a direction perpendicular to the longitudinal direction of the material.

The reinforced synthetic non-woven material can contain glass fibers in an amount suitable for imparting a reinforcing effect to such material. For example, the reinforced synthetic non-woven material can contain glass fibers in an amount of from about 10 to about 100 grams/m$^2$, based on the surface area of the reinforced synthetic non-woven material. The reinforced synthetic non-woven material can contain a binder in an amount suitable for sufficiently adhering the glass fibers to the substrate. For example, the reinforced synthetic non-woven material can contain the binder in an amount of from about 15 to about 40 grams/m$^2$, based on the surface area of the reinforced synthetic non-woven material. The weight of the reinforced synthetic non-woven material can depend on the particular application of the material and can be, for example, from about 50 to about 300 grams/m$^2$, more preferably from about 110 to about 250 grams/m$^2$.

In an exemplary embodiment, the reinforced synthetic non-woven material can contain glass fibers in an amount of from about 5% to about 70%, more preferably from about 20% to about 40%, based on the surface area of a surface of the reinforced synthetic non-woven material. The reinforced synthetic non-woven material can also contain a binder in an amount of from about 5% to about 30%, more preferably from about 7% to about 19%, based on the surface area of a surface of the reinforced synthetic non-woven material.

In an exemplary embodiment, a majority of the glass fibers are present above or in contact with the surface of the polyester non-woven material. For example, in an exemplary embodiment, only a small amount of the glass fibers can penetrate into the surface of the polyester non-woven material. Maintaining a majority and more preferably at least about 95% of the glass fibers above or in contact with the surface of the polyester non-woven material can improve the flame resistance of the reinforced product, for example, in comparison with a conventional glass-fiber containing material in which a majority of the glass fibers is not arranged at the outer portion of the product.

While various embodiments have been described in detail, it will be apparent to one skilled in the art that various changes and modifications can be made, and equivalents employed without departing from the scope of the claims.

What is claimed is:

1. A method for producing a reinforced polyester non-woven material suitable for use as a roofing material, comprising:
   forming a first layer of polyester non-woven material;
   providing a container which contains loose, unbound glass fibers substantially free of a binder, wherein the container has at feast one opening through which the loose, unbound glass fibers substantially free of a binder may pass;
   applying the loose, unbound glass fibers substantially free of a binder provided by the container, above the first layer of polyester non-woven material to form a layer of glass fibers substantially free of a binder;
   forming a second layer of polyester non-woven material above the layer of glass fibers substantially free of a binder;
   applying a liquid binder to a resulting structure comprising the first layer, the layer of glass fibers substantially free of a binder, and the second layer; and
   curing the liquid binder such that the layer of glass fibers is attached to the first and second layers of polyester non-woven material.

2. The method of claim 1, wherein the polyester non-woven material has an elongated shape.

3. The method of claim 1, wherein the glass fibers are randomly oriented in the plane of the polyester non-woven material.

4. The method of claim 1, further comprising conveying the first layer of polyester non-woven material, wherein the step of forming the layer of glass fibers is conducted while the material is conveyed.

5. The method of claim 1, wherein the binder comprises an acrylate, styrenebutadlen, latex or mixtures thereof.

6. The method of claim 1, wherein the glass fibers are present in an amount of from about 10 to about 100 grams/m$^2$, based on the surface area of the reinforced material.

7. The method of claim 1, wherein the binder is present in an amount of from about 15 to about 40 grams/m$^2$, based on the surface area of the reinforced material.

8. A method for producing a reinforced polyester non-woven material suitable for use as a roofing material, comprising:
   providing a first layer of polyester non-woven material;
   providing a container which contains loose, unbound glass fibers substantially free of a binder, wherein the container has at least one opening through which the loose, unbound glass fibers substantially free of a binder may pass;
   applying the loose, unbound glass fibers substantially free of a binder provided by the container, above the first layer of polyester non-woven material to form a layer of glass fibers substantially free of a binder;
   providing a second layer of polyester non-woven material above the layer of glass fibers substantially free of a binder;
   applying a liquid binder to a resulting structure comprising the first layer, the layer of glass fibers substantially free of a binder, and the second layer; and
   curing the liquid binder such that the layer of glass fibers is attached to the first and second layers of polyester non-woven material.

* * * * *